United States Patent [19]

Mickelson

[11] 3,922,897
[45] Dec. 2, 1975

[54] SEMITRAILER KING PIN SECURING DEVICE

[76] Inventor: Thorwald J. Mickelson, 5550 Shorewood Lane, Excelsior, Minn. 55331

[22] Filed: Dec. 5, 1974

[21] Appl. No.: 529,797

[52] U.S. Cl. .................................. 70/232; 70/34
[51] Int. Cl.² .................... B60R 25/00; F16B 41/00
[58] Field of Search .......... 70/34, 57, 58, 229, 231, 70/232, 258, 259, DIG. 58

[56] References Cited
UNITED STATES PATENTS

| | | | |
|---|---|---|---|
| 3,756,639 | 9/1973 | Wilkinson | 292/179 |
| 3,763,675 | 10/1973 | Hofmeister et al. | 70/232 |

Primary Examiner—Albert G. Craig, Jr.
Attorney, Agent, or Firm—Merchant, Gould, Smith, Edell, Welter & Schmidt

[57] ABSTRACT

A locking mechanism adapted for being detachably secured to a king pin on a semitrailer embodying, in essential respects, a housing member and, disposed therein, a slidable locking bar being movable between an inward locked position and an outward unlocked position. A first gravity responsive locking tumbler, disposed within a first notch formed in the housing member is effective to interlock with a first pair of slots on the locking bar to hold the latter in the locked position. The first locking tumbler is operable by a locking device to be removed from locking register with the first pair of slots, thereby enabling the locking bar to be moved outwardly to the unlocked position. A second gravity responsive tumbler or locking detent is normally carried within and by a second pair of slots on the locking bar and is effective to automatically interlock with a second notch formed in the housing member when the locking mechanism is in an inverted condition. Stop shoulders formed on the locking bar, adjacent the first pair of slots are effective to selectively engage the first tumbler, whenever the latter is raised from the first pair of slots and the locking bar is pulled outwardly. The stop shoulders not only prevent complete withdrawal of the locking bar from the housing member but also insure a correct vertical alignment of the second notch and second pair of slots.

9 Claims, 6 Drawing Figures

U.S. Patent  Dec. 2, 1975  3,922,897
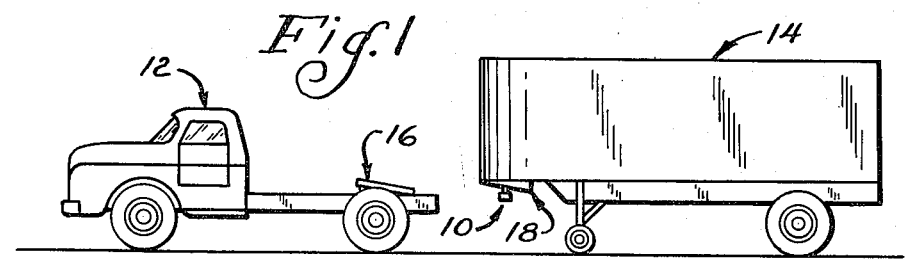
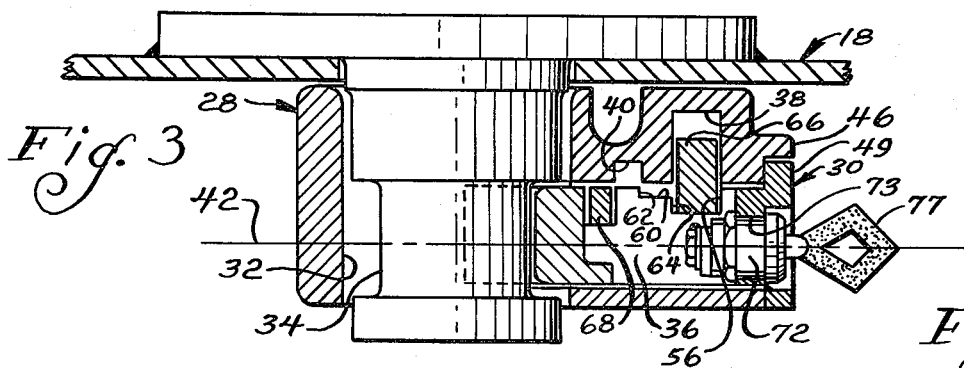
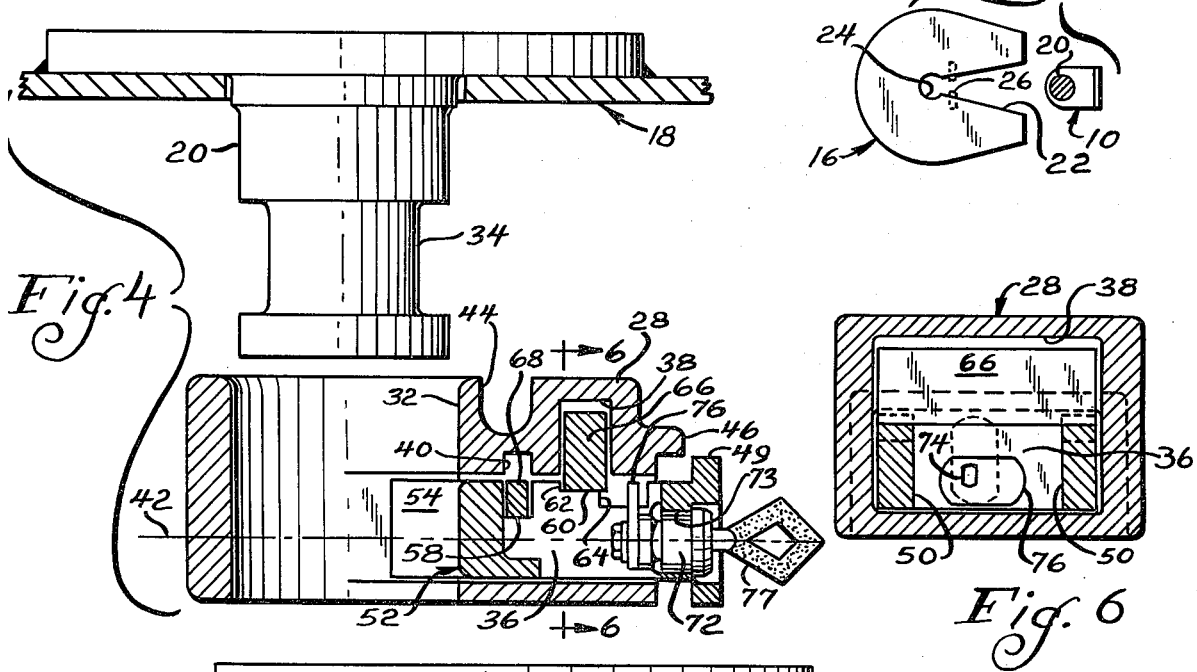
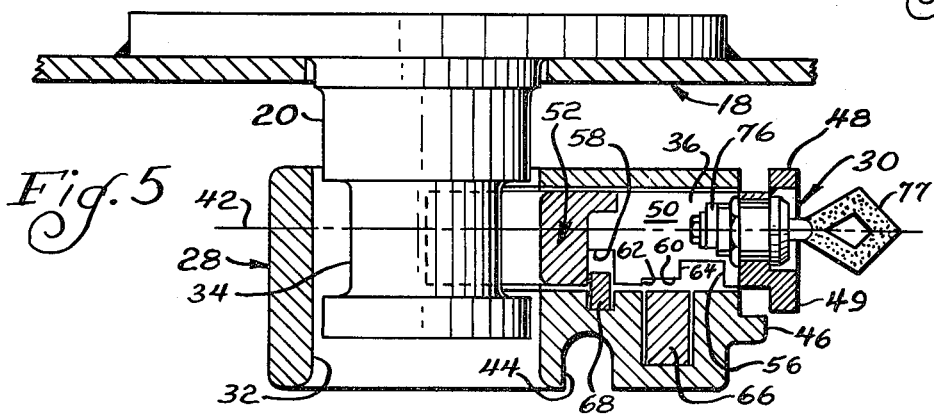

SEMITRAILER KING PIN SECURING DEVICE

Background Of The Invention

The present invention is related to a locking mechanism and, in particular, to a locking mechanism which is especially adapted for being selectively detachably secured to a king pin on a conventional semitrailer or the like.

In recent years, the trucking industry has been plagued by a relatively large number of thefts. One such common type of theft which, all too frequently, occurs is the stealing of parked conventional semitrailers located at, for instance, a trucking depot. Typically, whenever a semitrailer is left unattended, even for relatively short intervals of time, a dishonest party will interconnect the fifth wheel mechanism on a tractor with the king pin of the parked semitrailer and thereafter proceed to carry off with the trailer. Although prior art devices for preventing this type of theft exist, such as disclosed in U.S. Pat. No. 3,763,675, they are somewhat structurally complicated (in construction) due to the presence of springs, cover plates, screws, etc. Consequently, such types, as disclosed in the above referenced patent, are somewhat more complicated in construction and relatively more costly to manufacture.

Summary Of The Invention

Accordingly, it is therefore an object of the present invention to provide a locking mechanism which not only overcomes the aforementioned theft problems relating to the unauthorized carrying off of unattended parked semitrailers but also provide an improved locking mechanism which is simple in construction and operation and is relatively inexpensive to manufacture.

It is another object of the present invention to provide a locking mechanism which is durable in construction, reliable in operation, and virtually inexcessible to unauthorized tampering with the locking components thereof.

It is another object of the present invention to provide a locking mechanism which automatically alerts an operator whenever it has been improperly fitted over the king pin.

In order to accomplish the objects, as aforementioned, the present invention contemplates a locking mechanism which is particularly adapted for being detachably secured to a king pin structure which normally depends from the underside surface of a conventional semitrailer. The locking mechanism embodies a housing member which includes a king pin receiving bore extending therethrough, a cut-out area longitudinally extending transversely to the king pin receiving bore and in open communication therewith. The housing member further includes spaced first and second notches which are generally rectangular in cross section and are in communication with the cut-out area. Disposed within the housing member is a locking bar which is snugly and slidably arranged for longitudinal movement between an outwardly disposed unlocked position and an inwardly disposed locked position. Provided at one end of the locking bar is a main body portion which has two spaced leg members extending forwardly therefrom and terminating at and intergrally connected by, a generally arcuate king pin contact member having an arcuate engaging surface. The arcuate engaging surface is provided with a radius of curvature which is preferably somewhat smaller than that of the king pin receiving bore and somewhat larger than the king pin itself. The arcuate engaging surface is adapted to be selectively engaged with an annular shoulder on the king pin for firmly interlocking the locking bar to the king pin.

A pair of slots are located at spaced intervals on each of the locking bar leg members to form first and second aligned pairs which are suitably arranged to come in registration with the first and second notches, respectively. Slidably retained for vertical movement within the first notch is a first generally rectangular shaped locking tumbler or bar. The tumbler is responsive to gravity, and is effective to fall into the first pair of slots whenever the former and the latter are in registry with each other. Whenever, this situation occurs the locking bar is in its inward locked position, whereby the arcuate engagement surface is in engagement with the annular shoulder on the king pin to interlock the former to the latter.

A pick-proof, conventionally constructed key-operated lock device is secured to the main body of the locking bar. Such type of lock is provided with a latch arm which is operable to be swung through an angular distance, in a well known fashion, sufficient to raise the first tumbler to an elevation whereby it does not contact the forward edge of the first pair of slots thereby enabling movement of the locking bar to the unlocked position.

Forwardly arranged adjacent each of the first pair of slots is a step surface having a stop shoulder at one end thereof and which is adapted to engage the bottom edge of the tumbler as the locking bar is being moved to the unlocked position, thereby precluding the locking bar from being completely withdrawn from the housing member. Additionally, the stop shoulders are appropriately spaced from the first pair of slots to insure proper registry or vertical alignment of the second notch with the second pair of slots whenever the locking bar is in the unlocked position.

A locking detent or second tumbler is provided for the locking mechanism and is normally retained within the second pair of slots for vertical movement in response to operation by gravity. The locking detent is arranged so that whenever the aforenoted vertical alignment or registry exists between the second notch and the second pair of slots, and the locking mechanism is in an inverted position, the locking detent will, under the influence of gravity, partially fall within and interlock with the second notch, whereby further movement of the locking bar is precluded. Consequently, such an interlocking condition will adequately and automatically alert an operator to a condition wherein the locking mechanism is improperly fitted over the king pin.

These, and other objects, features and advantages of the preferred embodiment of the present invention will become readily apparent upon a reading of the detailed description thereof when taken in conjunction with the several views of the drawings, wherein like reference numerals indicates like structure.

Brief Description Of The Drawings

FIG. 1 is a side elevational view showing a typical truck rigging with which the improved locking mechanism embodying the principles of the present invention is used in conjunction with;

FIG. 2 is a plan view schematically illustrating a conventional fifth wheel mechanism used on a tractor and the locking mechanism of the present invention interlocked with a king pin on a semitrailer;

FIG. 3 is a sectional side elevational view of the locking mechanism of the present invention as shown in the locked position;

FIG. 4 is a sectional side elevational view similar to FIG. 3, however, showing the locking mechanism of the present invention in the unlocked position;

FIG. 5 is a sectional side elevational view of the locking mechanism of the present invention wherein it is in an inverted unlocked position;

FIG. 6 is a sectional end elevational view taken substantially along section line 6—6 of FIG. 4 looking in the direction indicated by the arrows.

Description Of The Preferred Embodiment

Referring to FIG. 1 the improved locking mechanism of the present embodiment made in accordance with the principles of the present invention is generally designated by reference numeral 10. The locking mechanism is shown as used in conjunction with a conventional truck rigging which includes a suitable and well known type of tractor vehicle 12 which is normally arranged to furnish transportation for a typical semitrailer 14 which carries goods and the like. In order to effect the required interconnection between the tractor 12 and the semitrailer 14, the tractor is provided with a conventional fifth wheel mechanism 16 which cooperates in a known manner with an ordinary type of king pin means 18.

As perhaps best depicted in FIGS. 2 through 5, the locking mechanism 10 is adapted to be releasably secured to the king pin means 18. Particular reference is made to FIG. 2, wherein the manner by which the improved locking mechanism 10 of the present invention is used to preclude unauthorized hitching of the tractor 12 and semitrailer 14 can best be described. Ordinarily, if the locking mechanism 10 were not interlocked with a king pin 20 depending from the lower or underneath surface of the king pin means 18, the hitching would normally be accomplished by backing the fifth wheel mechanism 16 toward the king pin means 20. In such an operation, the converging slot 22 on the fifth wheel mechanism 16 direct the king pin 20 toward recess 24, whereby the king pin will be received therein. Thereafter, a lock mechanism 26 is operated to retain the king pin 20 within the recess 24. However, with the locking mechanism 10, in firm locking engagement with king pin 20 and by virtue of its size relative to the guide slot 22 the aforedescribed hitching operation is prevented because the locking mechanism 10 obstructs passage of the king pin 20 to the recess 24.

Although the locking mechanism 10 of the preferred embodiment to be presently described is shown as used in connection with a king pin 20 on a semitrailer 14, it is emphasized that the principles of the present invention permit the locking mechanism to be employed in other similar circumstances, wherein a locking mechanism is desired to be interlocked with a generally elongated member or the like.

As best illustrated in FIG. 3 taken in conjunction with FIGS. 4 and 5 the locking mechanism 10 is shown as including, in essential respects, a housing member and a locking bar 30 disposed within the housing member 28 for slidable movement between an inward locked position (FIG. 3) and an outward unlocked position (FIG. 4). Preferably, both the housing member 28 and the locking bar 30 are fabricated from a similar type material which should possess a certain amount of rigidity and strength to resist repeated poundings without failure or fracture, as well as the ability to withstand various kinds of weather conditions.

With particular reference to FIGS. 2 through 5, the housing member 28 is dimensioned to be larger than the transverse spacing between the slot 22 for the purposes aforedescribed. The housing member 28 includes a generally vertically extending bore 32 which is appropriately dimensioned to fit over a free end of the king pin 20, which as aforementioned, depends from the underneath surface of the king pin means 18. Typically, the king pin 20 is provided at its lower end with a reduced annular surface 34. Extending generally transversely to the bore 32 is a generally rectangular shaped cut-out area or chamber 36. The cut-out area 36 is also formed so as to have one end thereof terminate in open communication with the bore 32. Formed within the housing member 28 adjacent the cut-out area 36 are a first and second spaced and desirably parallel notch means 38 and 40, respectively which extend generally in a transverse direction relative to the longitudinal axis 42 of the locking bar 30. Both notches 38 and 40 have a generally rectangular cross-sectional shape with the first notch 38 having a larger dimension than the second notch 40. Exteriorly extending across the top surface of the housing member is a groove 44 which serves to somewhat reduce the overall weight of the locking mechanism 10, thereby making it easier to handle. The rearward end of the housing member has provided thereon a transversely and laterally extending ledge portion 46, the purpose of which will be subsequently described.

Referring now to FIGS. 2 through 6, the locking bar 30 is more clearly shown as including a rearward main body portion 48 having preferably, an upwardly and rearwardly extending flange 49 which in the locking position, will be closely beneath and flush with lateral ledge 46, whereby the rearward end of the locking mechanism 10 is virtually in accessible to outside tampering. Forwardly extending from the main body portion are two generally parallel and spaced apart leg members 50 which terminates at and are integrally connected by a generally arcuate king pin contact member 52 having an arcuate engagement surface 54 for selective contact with the annular shoulder 34 on king pin 20. The engagement surface 54 has a radius of curvature which is somewhat less than that for the king pin receiving bore 32 but on the other hand is slightly larger than that of the king pin 20. Desirably, the engagement surface 54 extends through an angle substantially less than 180 degrees but greater than 90 degrees.

Intermediately located on each of the leg members are first and second pairs of slots 56, 58, respectively. Each slot of the first and second pairs 56, 58, is aligned with the other slot of its respective pair and are selectively adapted to be in registry with first and second notch means 38 and 40, respectively, for purposes to be hereinafter made apparent in the ensuing description of the present invention. Adjacent each of the first pair of slots 56 are step surfaces 60 with stop shoulders 62 at one end thereof. The stop shoulders 62 are so arranged and spaced relative to the forward edges 64 of the first pair of slots 56, for reasons which will afterwards be made more apparent.

The locking components of the locking mechanism 10 include a first locking tumbler or bar 66 and a second locking tumbler or detent 68. Both of these tumblers 66, 68 are responsive to gravitational forces and therefore, do not require springs or other similar types of biasing means. Consequently, construction costs for the locking mechanism 10 are somewhat reduced. The first tumbler 68 is generally rectangular in shape and is appropriately dimensioned to snugly and slidably fit within the first notch means 38 for vertical movement between a locked (FIG. 3) and unlocked (FIGS. 4 to 6) position. As best shown in FIG. 3, the first tumbler 66 is in the locked position, whenever it is received within the first pair of slots 56. As clearly shown in FIG. 4 the first tumbler 66 is in its unlocked position whenever it rests on step surfaces 60 and its lower edge is in abutment with the stop shoulders 62. In this unlocked position the locking bar 30 is permitted to be longitudinally moved from the locked position to the unlocked position. The stop shoulders 62 serve to limit complete withdrawal of the locking bar 30 from the housing member 28. Additionally, and as aforenoted, the stop shoulders 62 are appropriately spaced from the forward edges 64. The distance of the spacing should be so selected as to insure proper vertical alignment between the second pair of slots 58 and second notch means 40. The locking detent 68 is normally carried by the second pair of slots 58 and is of generally rectangular configuration. It is snugly fitted for vertical movement within the second pair of slots 58, and whenever the second pair of slots are in register or vertical alignment with the second notch means 40, the detent 68 is permitted to fall into the latter when the locking mechanism 10 is inverted (See FIG. 5) for purposes presently to be described. The proper vertical alignment or registry above noted results from the fact that the stop shoulders 62 contact the lower edge of the first tumbler 66 when locking bar 30 is being moved to its unlocked position (see FIGS. 4 & 5). The resulting register between the second pair of slots and second notch will as aforementioned permit the locking detent 68 to fall into the second notch 40 by means of gravity if the locking mechanism 10 is not only in the unlocked position but is fitted over the king pin 20 in an inverted condition. Thusly, an interlock arrangement will arise between the locking bar 30 and the housing member 28 and the former will be prevented from being pushed inwardly to the locked position. Therefore, an operator will be automatically alerted if the locking mechanism 10 is being improperly mounted on the king pin 20.

As shown in FIGS. 3 to 5 a conventional pick-proof key-operated type lock device 70 has its lock cylinder 72 secured within and through an opening 73 of the main body portion 48 in a conventional fashion. As more precisely noted in FIG. 6, the lock device 70 is provided with a lock shaft 74 and lock arm 76 suitably secured thereto, and operable to move between two angular orientations separated by about 90°, one of which is indicated by the solid lines, and the other by dotted lines. In response to the insertion of a proper key 77 within lock device 70, lock cylinder 72 is operated to rotate lock shaft 74, in a well known manner, thereby raising lock arm 76 from its generally horizontal position (solid lines) to its generally vertical position (dotted lines), whereby the first tumbler 66 is sufficiently elevated from contact with the first pair of slots 56 so as to move the former to its unlocked position. The lock device 70 is of the type which will only permit removal of the key whenever the lock device is in the locked position.

Having thus described a preferred construction for the locking mechanism 10 of the present invention, its operation will be subsequently discussed. To detachably mount or secure the locking mechanism 10 to the king pin 20 the locking bar 30 must, of course, be in the unlocked position (FIG. 4). The king pin receiving bore 32 is fitted over the end of king pin 20 so that the engagement surface 54 will be in approximate alignment with reduced annular shoulder 34. Thereafter, the locking bar 30 is pushed inwardly relative to the housing member 28 until there is substantial vertical alignment between the first notch means 38 and first pair of slots 56. At this time by virtue of the aforenoted alignment, the first tumbler 66 which is normally carried by the steps 60 whenever the locking bar 30 is in its unlocked position, will, in response to gravity, fall into the first pair of slots 56 thereby effecting on interlocking engagement with between the locking bar 30 and housing member 28. Conjointly with this action engagement surface 54 will tightly contact annular shoulder 34, thereby effecting a firm interlock between the locking bar 30 and king pin 20. Thusly, not only is there a firm interlock arrangement between the housing member 28 and the locking bar 30 by reason of the first tumbler 66 being received within the first pair of slots 56 but also there is a firm interlock between the engagement surface 54 and annular shoulder 34. In such a locked condition, the locking mechanism 10, which as aforenoted by reason of its transverse dimension relative to the converging guide slots 22, will obstruct passage of the king pin 20 to the recess 24 in the fifth wheel mechanism 16. Furthermore, due to the relative closeness of fit existing between the flange 49 on the main body portion 48 and lateral ledge 46, the interior of the locking mechanism 10 will be virtually inaccessible to outside tampering.

Whenever it is desired to remove the locking bar 30 from contact with the king pin 20, an operator can manipulate key 77 of locking device 70 so as to rotate the lock arm 76 to its raised position. Rotation of the lock arm 76 will effectuate a raising of the first tumbler 66 to a vertical distance above edges 64 and thereby move the tumbler out of contact with the first pair of slots 56. Consequently, the locking bar 30 may be pulled outwardly until the stop shoulders 62 contact the lower portion of the first tumbler 66. It will, of course, be understood that the lock arm 76 is rotated in the opposite direction prior to pulling of the locking bar 30 so as to prevent the lock arm 76 from abutting an inner surface of the first notch means 38. Upon contact of the stop shoulders 62 with the first tumbler 66 the locking mechanism 10 is in its unlocked position (FIG. 4). Also as aforementioned, due to the arrangement and spacing of the stop shoulders 62 relative to the first pair of slots 56, the locking bar 30 can only be moved to the position shown in FIG. 4. In this particular position, the arcuate engagement surface 54 is no longer in contact with the annular shoulder 34, thereby permitting easy separation of the two. Furthermore, the stop shoulders serve to provide the proper vertical alignment or registry between the second pair of slots 58 and the second notch means 40.

If an operator desires to relock the locking mechanism 10 on king pin 20, he will be prevented from improperly mounting the locking mechanism 10. For instance, if the locking mechanism 10 is fitted over the king pin so that it is in an inverted condition (FIG. 5) the above noted registry of the second pair of slots 58 and the second notch means 40 permit the locking detent 68, in response to gravity, to fall into the second notch means. The second notch means 40 has a depth which is somewhat less than the dimension of the locking detent 68, whereby locking detent bridges or interlocks with the locking bar 30 and the housing member 28. Whenever the locking detent 68 is in this position the locking bar 30 will be prevented from being moved inwardly. Thus, any inward force on the locking bar 30 will be resisted and, of course, the operator will be automatically alerted that the locking mechanism 10 is improperly positioned relative to king pin 20.

It is believed apparent from the foregoing description of the preferred construction and operation of the improved locking mechanism of the present invention, as used in conjunction with a king pin on a conventional semitrailer, a detachable and secure interlocking arrangement is accomplished by means of a locking mechanism which includes relatively few components, can be economically manufactured, and easily assembled, as well being durable in construction, reliable in use, and able to automatically alert an operator of an improper mounting thereof on the king pin.

While the particular embodiment of the present invention has been shown and described, it will, of course, be obvious to those skilled in the art that changes and modifications may be made thereto without departing from the invention in its broader aspects and therefore, the aim in the appended claims is to cover all such changes and modifications as fairly fall within the scope of the invention.

The invention claimed is:

1. A locking mechanism adapted for being releasably secured to a generally elongated member comprising a member have an opening therethrough for receiving said elongated member, a cut-out area in open communication with said opening, first and second pair of spaced notch means formed in said member and disposed above said cut-out area, a movable element slidably received by said cut-out area having spaced leg members joined by a contact member with an engagement surface, and first and second pairs of spaced slots formed intermediately on said leg members, said movable member being longitudinally movable within said member between an outward unlocked position and an inward locked position whereby, whenever in the locked position said engagement surface interlocks with said elongated member received within said opening and whenever in the unlocked position said engagement surface is out of interlocking relationship with said elongated member, a tumbler normally received within said first notch means for vertical movement relative thereto for selective interlocking engagement with said first pair of slots when said movable element is in the locked position, a gravity responsive locking detent means normally received within said second pair of slots for vertical movement relative thereto and into said second notch means whenever said locking mechanism is in an inverted position and said movable element is in the unlocked position thereby preventing said movable element from moving to the locked position, whereby an operator is automatically alerted to an improper locking mechanism position, and a locking device connected to said movable element being selectively operable for vertically raising said tumbler from said first pair of slots and out of interlocking engagement therewith, thereby permitting movement of said movable member to the unlocked position.

2. A locking mechanism as set forth in claim 1 wherein said movable member is provided with a step surface formed adjacent each of said first pair of slots and having at one end thereof a stop shoulder for engagement with said tumbler whenever said tumbler is in its raised position thereby preventing complete withdrawal of said movable element from said member.

3. A locking mechanism as set forth in claim 2 wherein said stop shoulders are spaced from said first pair of slots by a distance which will insure proper vertical alignment between said second pair of slots and said second notch means when said movable element is in the unlocked position whereby in event the locking mechanism is in an inverted condition, said locking detent will fall into said second notch means to thereby interlock said movable element to said member.

4. A locking mechanism as set forth in claim 1 wherein said member having a rearwardly extending ledge portion and said movable element has a portion which is flush with said ledge portion when said movable element is in the locked position for providing a relatively close fit there-between which is virtually inaccessible to tampering.

5. A locking mechanism adapted for being releasably locked onto a king pin or the like of a semitrailer comprising a housing member having a king pin receiving bore extending therethrough, a longitudinally extending cut-out area in open communication with said receiving bore, first and second pair of spaced notch means formed in said housing member and disposed above said cut-out area, a locking bar slidably received by said cut-out area having spaced leg members joined by a king pin contact member with an engagement surface and first and second pairs of spaced slots intermediately formed on said leg members said locking bar being longitudinally movable within said housing member between an outward unlocked position and an inward locked position, whereby whenever in the locked position said engagement surface interlocks with said king pin received within said king pin receiving bore and whenever in the unlocked position said engagement surface is out of interlocking relationship with said king pin, a gravity responsive tumbler normally received within said first notch means for vertical movement relative thereto for selective interlocking engagement with said first pair of slots when said locking bar is in the locked position, a gravity responsive locking detent means normally received within said second pair of slots for vertical movement relative thereto and into said second notch means whenever said locking mechanism is in an inverted position and said locking bar is in the unlocked position thereby preventing said locking bar from moving to the locked position, whereby an operator is automatically alerted to an improper locking mechanism position, and a locking device connected to said locking bar being selectively operable for vertically raising said tumbler from said first pair of slots thereby permitting movement of said locking bar to the unlocked position.

6. A locking mechanism as set forth in claim 5 wherein each of said leg members is provided with step surfaces located adjacent said first pair of slots and having at one end thereof a stop shoulder for engagement with said first tumbler whenever said first tumbler is raised from said first pair of slots thereby preventing complete withdrawal of said locking bar from said housing member.

7. A locking mechanism as set forth in claim 6 wherein said stop shoulders are spaced from said first pair of slots by a distance which will insure proper vertical alignment between said second pair of slots and said second notch means when said locking bar is in the unlocked position, whereby in event said locking mechanism is in an inverted position, said locking detent will fall into said second notch means to thereby interlock said locking bar to said housing member.

8. A locking mechanism as set forth in claim 5 wherein said housing member having a rearwardly extending leg portion and said locking bar has a flange portion which is flush with said ledge portion when said locking bar is in the locked position for providing a relatively close fit there-between which is virtually inaccessible to tampering.

9. A locking mechanism adapted for being releasably locked on king pin or the like of a semitrailer comprising a housing member having a king pin receiving bore extending therethrough, a longitudinally extending cut-out area in open communication with said receiving bore, first and second pair of spaced notch means formed in said housing member disposed above said cut-out area, a locking bar slidably received by said cut-out area having spaced leg members joined by a king pin contact member with an engagement surface and first and second pairs of spaced slots intermediately formed on said leg members said locking bar longitudinally movable within said housing member between an outward unlocked position and an inward locked position, whereby whenever in the locked position said engagement surface interlocks with said king pin received within said king pin receiving bore and whenever in the unlocked position said engagement surface is out of locking relationship with said king pin, a gravity responsive tumbler normally received within said first notch means for vertical movement relative thereto for selective interlocking engagement with said first pair of slots when said locking bar is in the locked position, a gravity responsive locking detent means normally received within said second pair of slots for vertical movement relative thereto and into said second notch means whenever said locking mechanism is in inverted position and said locking bar is in the unlocked position thereby preventing said locking bar from moving to the locked position whereby an operator is automatically alerted to an improper locking mechanism position, and a locking device connected to said locking bar being selectively operable for vertically raising said tumbler from said first pair of slots thereby permitting movement of said locking bar to the unlocked position, wherein each of said leg members is provided with a step surface located adjacent said first pair of slots and having at one end thereof a stop shoulder for engagement with said first tumbler whenever said first tumbler is raised from said first pair of slots thereby preventing complete withdrawal of said locking bar from said housing member, said stop shoulders being spaced from said first pair of slots by a distance which will insure proper vertical alignment between said second pair of slots and said second notch means when said locking bar is in the unlocked position whereby in event said locking mechanism is in an inverted position, said locking detent will fall into said second notch means to thereby interlock said locking bar to said housing member, said housing member having a rearwardly extending ledge portion and said locking bar has a flange portion which is flush with said ledge portion when said locking bar is in the locked position for providing a relatively close fit wherebetween which is virtually inaccessible to tampering.

* * * * *